United States Patent [19]
Dejneka et al.

[11] Patent Number: 6,077,799
[45] Date of Patent: Jun. 20, 2000

[54] SPCVD SILICATE GLASSES

[75] Inventors: Matthew J. Dejneka, Corning, N.Y.; Rostislav Khrapko, Moscow, Russian Federation

[73] Assignee: Corning Inc., Corning, N.Y.

[21] Appl. No.: 09/266,956

[22] Filed: Mar. 12, 1999

[51] Int. Cl.[7] .............................. C03C 13/04; C03C 3/06; C03C 3/062; C03C 3/083; C03C 3/112

[52] U.S. Cl. ................. 501/37; 501/42; 501/43; 501/54; 501/57; 501/68; 501/73; 359/341; 359/343

[58] Field of Search .................................. 501/42, 43, 54, 501/57, 68, 73, 37; 359/341, 343

[56] References Cited

U.S. PATENT DOCUMENTS

| | | |
|---|---|---|
| 3,535,266 | 10/1970 | Lee . |
| 4,160,654 | 7/1979 | Bartholomew et al. .................. 501/57 |
| 4,186,021 | 1/1980 | Chyung et al. ............................ 501/57 |
| 5,242,869 | 9/1993 | Tarumi et al. ............................. 501/64 |
| 5,798,306 | 8/1998 | Dickenson ................................ 501/57 |

FOREIGN PATENT DOCUMENTS

| | | |
|---|---|---|
| 04092825 | 3/1992 | Japan . |
| 98/58884 | 12/1998 | WIPO . |

OTHER PUBLICATIONS

"Optical Properties of Erbium–Doped Fibre Based on Fluorine Co–Doped Silica Glass." E.M. Dianov et al., *ECOC* (1994), pp. 959–962. (No Month).

"Gain–Flattened EDFA w/High Al Concentration for Multstage Repeatered WDM Transmission Systems." Yoshida, S. et al., *Electronics Letters*, Sep. 28, 1995, vol. 31, No. 20, pp. 1765–1767.

"Improvement of Gain Flatness of Optical Fluoride Fiber Amplifiers for Multiwavelength Transmission." Semenkoff, M. et al., *J. Non–Cryst. Solids* 184 (1995), pp. 240–243. (No Month).

"$Er^{+3}$—Doped Multicomponent Glass Core Fibre Amplifier Pumped at 1.48 μm." Ohashi, M. et al., *Electronics Letters*, Nov. 7, 1991, vol. 27, No. 23, pp. 2143–2145.

"Lanthanum CoDoped Erbium Fibre Amplifier." Nakazawa et al., Electronics Letters, Jun. 6, 1991, vol. 27, No. 12, pp. 1065–1067.

*Primary Examiner*—Mark L. Bell
*Assistant Examiner*—David Sample
*Attorney, Agent, or Firm*—Angela N. Nwaneri; Edward F. Murphy

[57] ABSTRACT

These glasses incorporate a combination of F and $Al_2O_3$ to achieve even wider fluorescence and improved gain flatness. In addition, SPCVD incorporates large amounts of N into low-loss fiber whose high charge has an impact on rare earth behavior. The Surface Plasma Chemical Vapor Deposition (SPCVD) produces fiber preforms with high levels of F, $Al_2O_3$, and N. These heavily fluorinated glasses provide much broader $Er^{3+}$ emission than Type I or Type II silica for enhanced multichannel amplifiers. SPCVD successfully fluorinates silica with losses below 5 dB/km and increased $Er^{3+}$ emission width.

18 Claims, 2 Drawing Sheets

SPCVD SILICATE GLASSES

TECHNICAL FIELD

This invention relates to fluorinated and nitrided silicate glasses made by Surface Plasma Chemical Vapor Deposition. The new glasses are useful for gain flattened $Er^{3+}$ fiber amplifiers.

BACKGROUND ART $Er^{3+}$ doped fiber amplifiers have revolutionized optical telecommunications by providing all-optical high-gain, low-noise amplification without the need for costly electronic repeaters. However, current amplifiers are not well suited for multichannel amplification due to the strong dependence of their gain as a function of wavelength. The fluorinated aluminosilicate glasses provide superior gain flatness in the 1530–1560 nm wavelength band over type I and type II silica. This enables simultaneous uniform amplification of multiple wavelengths for a 4–32× increase in bandwidth in both fiber and planar devices. This also makes high data rate communication systems practical and affordable. For example, 16 channels at 10 Gb/s (OC-192 Standard) for 160 Gb/s$^2$ or even 32 channels at 2.4 gb/s (OC-48 Standard) for 76.8 Gb/s total capacity are possible.

Recent developments show that fluorinating $Er^{3+}$ doped $SiO_2$ increases the fluorescence bandwidth emission at 1550 nm. The art also shows that $Al_2O_3$ additions increase the fluorescence line width and solubility of $Er^{3+}$.

DISCLOSURE OF INVENTION

Our development incorporates a combination of fluorine, $Al_2O_3$ and/or $Ga_2O_3$ to achieve even wider $Er^{3+}$ fluorescence and improved gain flatness in the 1550 nm telecom window. In addition, SPCVD can incorporate large amounts of F, $Al_2O_3$ and N into low-loss fiber all of which impact rare earth behavior. The SPCVD produces fiber preforms with high levels of fluorine, alumina, and nitrogen. These heavily fluorinated glasses provide much broader $Er^{3+}$ emission than Type I or Type II silica for enhanced multichannel amplifiers. SPCVD successfully fluorinates silica with losses below 5 dB/km and increased $Er^{3+}$ emission width.

The rare earth doped glass composition of this invention comprise:

| Component | Weight Percent |
|---|---|
| $SiO_2$ | 0–95 |
| $GeO_2$ | 0–95 |
| $Al_2O_3$ | 0–15 |
| $Ga_2O_3$ | 0–15 |
| F | 2–10 |
| N | 0–10 |
| $R_2O_3$ | 0.01–2.0 | wherein $SiO_2+GeO_2$ range from 80–95 wt. %, $Al_2O_3+Ga_2O_3$ range from 5–15 wt. %, F range from 2 to 10 wt. % and $R_2O_3$ is a rare earth oxide. The sums such as $SiO_2+GeO_2$ are fully interchangeable. Furthermore, each of $SiO_2$ and $GeO_2$ can range from 0–95% as long as the total $SiO_2+GeO_2$ is between 80 and 95%.

BEST MODE OF CARRYING OUT INVENTION

Figure 1:
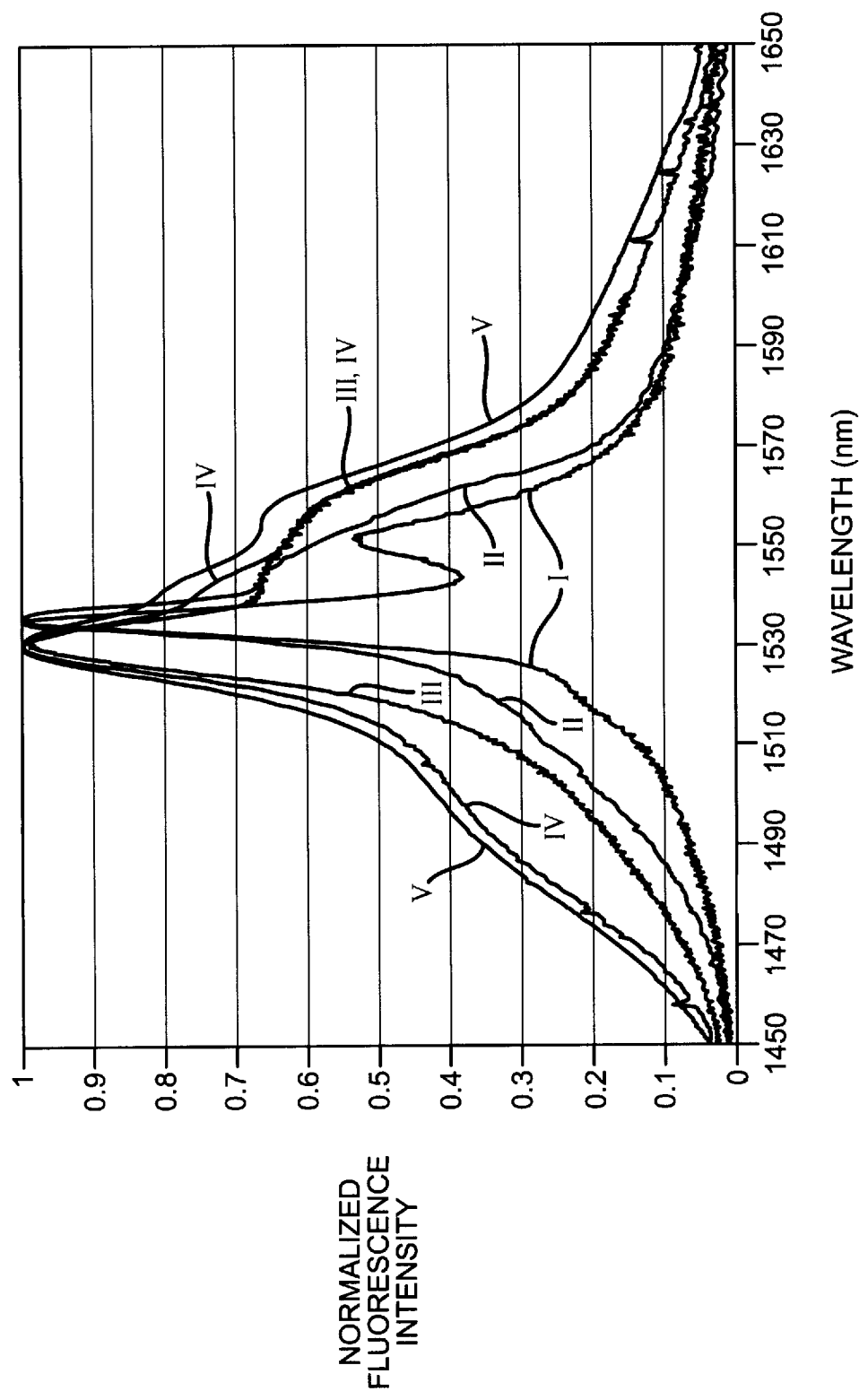
FIG. 1 is a graph showing the effect of our invention on $Er^{3+}$ fluorescence.

Most attempts to fluorine dope alumino silicate soot made by CVD lead to a stripping of $Al_2O_3$ and $GeO_2$ due to the high vapor pressures of $AlF_3$ and $GeF_4$. These attempts can not achieve F dopant levels above about 2 wt % F. However, SPCVD allows for simultaneous co-doping of high levels of fluorine, up to 5 wt %, and $Al_2O_3$. This achieves an even greater fluorescence line width and increased rare earth solubility. The SPCVD process deposits dense glass and not soot. Unlike outside vapor deposition (OVD), this prevents the loss of volatile components such as fluorine. The plasma environment creates a unique chemistry by ionizing the feed stock materials in the plasma. SPCVD also allows for the incorporation of nitrogen whose effects on $Er^{3+}$ provides an advantage by placing the rare earth in a high field environment.

Wide Er fluorescence emission up to 55 nm FWHM has been achieved in crucible melted glasses, but crucible melting has not produced fibers with losses below 100 dB/km. SPCVD makes high fluorine content glasses with high purity and low loss (<5 dB/km) thereby achieving the width of a crucible melted glass with the low-loss of CVD glass.

$SiO_2$ is the main component of the glass to maintain compatibility with existing fibers and processing. $Al_2O_3$ additions of greater than 3 wt % considerably broaden the $Er^{3+}$ emission, while F additions fill in the 1540 nm region and further broaden the $Er^{3+}$ emission envelope.

Preferably, the amount of F plus N ranges from 2.5 to 5.0 wt. %. The preferred embodiment contemplates only F, only N or the presence of both F and N.

Doping the glasses with a rare earth metal is desirable for enhancing the emission and absorption spectra, as discussed above. Therefore, the glasses of the present invention include an oxide of a rare earth element, such as Y, La, Ce, Pr, Nd, Pm, Sm, Eu, Gd, Tb, Dy, Ho, Er, Tm, Yb or Lu. Preferably, the rare earth element is Er, Pr, Eu, or Dy. Even more preferably, the rare earth element is Er (e.g., $Er_2O_3$).

The glasses also may contain various other components. For example, the glasses may further include 0–5 wt. % of other oxides, such as $Ta_2O_5$, $B_2O_3$, SnO, $ZrO_2$, $P_2O_5$, $Sb_2O_5$, $As_2O_3$ or $Bi_2O_3$.

All optical amplifiers, and particularly erbium doped fiber amplifiers have experienced explosive deployment in fiber optic telecommunication systems because of the well recognized advantages that these types of devices have over repeater type amplification schemes. For example, the erbium doped fiber amplifier (EDFA) conveniently operates in the preferred 1550 nm third telecommunications spectral window, has high polarization-insensitive gain, low cross talk between signals at different wavelengths, good saturation output power, and a noise figure close to the fundamental quantum limit. The excellent noise characteristics potentially allow hundreds of amplifiers to be incorporated along the length of a fiber telecommunications link which could then span thousands of kilometers. Optical amplifiers, and particularly EDFAs in contrast to electronic repeaters, are also transparent to data rate, signal format and wavelength over a limited range, making them especially useful for wavelength multiplexed communication systems that simultaneously transmit a large number of signals using different wavelength bands for each signal.

EXAMPLE I

Figure 2:
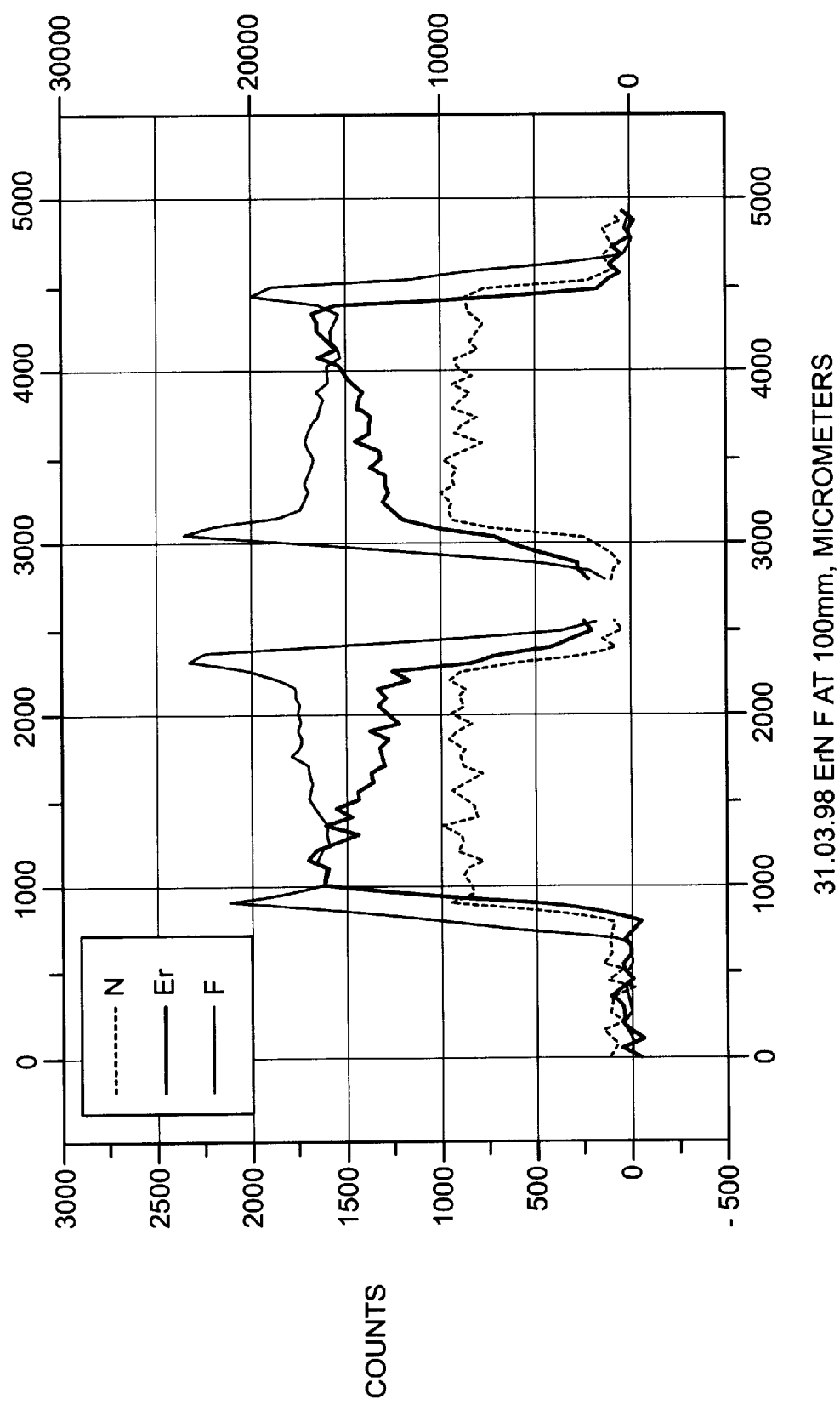
FIG. 2 is a graph showing microprobe compositional data of our fluorinated and nitrated preform.

FIG. 1 shows the normalized $Er^{3+}$ emission intensity as a function of wavelength. The emission spectra of $Er^{3+}$ in pure $SiO_2$ (curve I) is the narrowest. The additions of fluorine (curve II) and $Al_2O_3$ (curve III) significantly broaden the emission from 23 nm to 28 and 44 nm FWHM respectively. Losses of less than 2 dB/km have been achieved in both systems. By combining F and $Al_2O_3$, the width is further increased to 50 nm (curve IV). By adding appropriate glass modifiers such as CaO and $Ta_2O_5$ or $K_2O$ and $Sb_2O_3$ emission FWHM in excess of 55 nm can be achieved. Curve V shows the $Er^{3+}$ fluorescence from a $CaO$—$Ta_2O_5$—$Al_2O_3$—$SiO_2$ glass FIG. 2 shows that F, N and Er can be simultaneously doped into the preform. The $N^{3-}$ anion has a high charge that significantly alters the amplification characteristics. The combination of F and N also are beneficial since one F- and one $N^{3-}$ can substitute for two $O^{2-}$ to form a pseudo-oxide structure.

EXAMPLE II (Prior Art)

$Al_2O_3$ doping is currently used in Type II EDFA to both increase the $Er_{3+}$ solubility and gain flatness over pure $SiO_2$. However, these compositions can only yield a 40 nm band gain ripple of 30% and are prone to devitrification at high levels of $Al_2O_3$, greater than a few wt %. The inventive glasses yield a 40 nm band gain ripple of less than 20% and are therefor more desirable for multichannel EDFA's.

Fluoride glasses such as ZBLAN ($53ZrF_4$-$20BaF_2$-$4LaF_3$-$3AlF_3$-$20NaF$ in mole %) are also known for their gain flatness and low phonon energy. They must be pumped at 1480 nm due to upconversion, and as a result of the 1480 pumping, they have increased noise. They also are extremely difficult to fiberize, are not fusion sliceable, are prone to devitrification and have poor durability.

These glasses provide a means for producing low-loss rare earth doped fiber with improved gain flatness for increased channel capacity. Fiber produced by this method is fusion spliceable, compatible with existing draw methods and applicable to both fiber and planar amplifiers.

In addition to these embodiments, persons skilled in the art can see that numerous modifications and changes may be made to the above invention without departing from the intended spirit and scope thereof.

We claim:

1. A rare earth doped surface plasma chemical vapor deposition fluorine doped glass comprising:

| Component | Weight Percent |
| --- | --- |
| $SiO_2$ | 0–95 |
| $GeO_2$ | 0–95 |
| $Al_2O_3$ | 0–15 |
| $Ga_2O_3$ | 0–15 |
| F | 2–10 |
| N | 0–10 |
| $R_2O_3$ | 0.01–2.0 | with a $SiO_2$+$GeO_2$ range from 80–95 wt. %, an $Al_2O_3$+$Ga_2O_3$ range from 5–15 wt. %, and $R_2O_3$ is a rare earth oxide, wherein the fluorine doped glass is a high purity deposited dense glass in which volatile loss of fluorine is prevented.

2. A glass according to claim 1 wherein F and N range from 2.5 to 5.0 wt. %.

3. A glass according to claim 1 wherein said glass has a 1550 nm loss <100 dB/km.

4. A glass according to claim 1 containing at least 3 weight percent $Al_2O_3$.

5. A glass according to claim 1 wherein $R_2O_3$ is a rare earth oxide of Y, La, Ce, Pr, Nd, Pm, Sm, Eu, Gd, Tb, Dy, Ho, Er, Tm, Yb or Lu.

6. A glass according to claim 1 wherein R is a rare earth oxide of Er, Pr, Eu or Dy.

7. A glass according to claim 1 wherein $R_2O_3$ is $Er_2O_3$.

8. A glass according to claim 1 wherein said glass has a 1550 nm loss <100 dB/km and an $Er^{3+}$ emission spectra with a FWHM>44 nm.

9. A glass according to claim 1 wherein said glass has a 1550 nm loss <5 dB/km and an $Er^{3+}$ emission spectra with a FWHM≧50 nm.

10. A glass according to claim 9 wherein said glass has a 40 nm $Er^{3+}$ band gain ripple less than 20%.

11. An optical amplifier comprising a glass of claim 10.

12. A glass according to claim 1 wherein said glass has a 1550 nm loss <5 dB/km and an $Er^{3+}$ emission spectra with a FWHM≧55 nm.

13. A glass according to claim 1 wherein said glass has a 40 nm $Er^{3+}$ band gain ripple less than 20%.

14. A glass fiber suitable for use as an optical fiber amplifier comprising the glass of claim 3.

15. An optical amplifying device comprising the glass fiber of claim 14.

16. An electrical optical device made from the glass of claim 1.

17. An erbium and fluorine doped surface plasma chemical deposition glass comprising:

| Component | Weight Percent |
| --- | --- |
| $SiO_2$ | 0–95 |
| $GeO_2$ | 0–95 |
| $Al_2O_3$ | 3–15 |
| $Ga_2O_3$ | 0–12 |
| F | 2–10 |
| N | greater than 0–10 |
| $R_2O_3$ | 0.01–2.0 | with a $SiO_2$+$GeO_2$ range from 80–95 wt. %, an $Al_2O_3$+$Ga_2O_3$ range from 5–15 wt. %, $R_2O_3$ is $Er_2O_3$, wherein the glass is a high purity deposited dense fluorinated glass formed from an ionizing plasma wherein a loss of volatile components is prevented, and said dense fluorinated glass is simultaneously doped with F and N so that the $F^-$ and $N^{3+}$ substitute for oxygen to form a pseudo-oxide glass structure.

18. An optical amplifier comprising a glass of claim 17, said glass having a 1550 nm loss <5 dB/km, an $Er^{3+}$ emission spectra with a FWHM>44 nm and a 40 nm $Er^{3+}$ band gain ripple less than 20%.

* * * * *